US012151525B1

(12) United States Patent
McAllister

(10) Patent No.: US 12,151,525 B1
(45) Date of Patent: Nov. 26, 2024

(54) LOAD MEASURING HITCH ASSEMBLY FOR MEASURING LOADS APPLIED BY A TRAILER ON A TOW VEHICLE

(71) Applicant: Weigh Safe, LLC, Lindon, UT (US)

(72) Inventor: Morgan McAllister, Lindon, UT (US)

(73) Assignee: Weigh Safe, LLC, Lindon, UT (US)

( * ) Notice: Subject to any disclaimer, the term of this patent is extended or adjusted under 35 U.S.C. 154(b) by 315 days.

(21) Appl. No.: 17/737,855

(22) Filed: May 5, 2022

Related U.S. Application Data

(60) Provisional application No. 63/184,763, filed on May 5, 2021.

(51) Int. Cl.
*B60D 1/24* (2006.01)
*B60D 1/06* (2006.01)
*B60D 1/64* (2006.01)

(52) U.S. Cl.
CPC .............. *B60D 1/248* (2013.01); *B60D 1/06* (2013.01); *B60D 1/64* (2013.01)

(58) Field of Classification Search
CPC ............. B60D 1/248; B60D 1/06; B60D 1/64
USPC ....................................................... 177/136
See application file for complete search history.

(56) References Cited

U.S. PATENT DOCUMENTS

| 6,722,684 | B1 | 4/2004 | McAllister |
| 8,696,011 | B2 | 4/2014 | Despres |
| 9,643,462 | B2 * | 5/2017 | McAllister ............. B60D 1/248 |
| 10,759,241 | B2 * | 9/2020 | McAllister ............... B60D 1/06 |
| 11,701,932 | B2 * | 7/2023 | McAllister ............. B60D 1/248 |
| | | | 177/136 |
| 11,813,904 | B2 | 11/2023 | Anderson |
| 11,897,298 | B2 * | 2/2024 | McAllister ............. B60D 1/248 |
| 2017/0334255 | A1 | 11/2017 | McAllister |
| 2021/0170818 | A1 * | 6/2021 | Doman .................... B60D 1/06 |
| 2022/0363096 | A1 * | 11/2022 | Doman ................. B60D 1/065 |

* cited by examiner

*Primary Examiner* — Jacques M Saint Surin
(74) *Attorney, Agent, or Firm* — Thorpe North & Western, LLP; David W. Osborne

(57) ABSTRACT

A load measuring hitch assembly is described. The assembly can include a body portion operable to facilitate coupling the load measuring hitch assembly to a tow vehicle. Additionally, the assembly can include a hitch ball coupled to the body portion. The hitch ball can include a ball operable to facilitate coupling the load measuring hitch assembly to a trailer. The hitch ball can also include a lower portion coupled to the body portion in a fixed relationship. The hitch ball can further include an instrument portion free to deflect due to at least one of a vertical or a horizontal force acting on the ball. In addition, the hitch ball can include one or more force sensors operably coupled to the instrument portion to measure a force on the instrument portion in at least one measurement axis, thereby facilitating determining a magnitude of the at least one of the vertical or the horizontal force acting on the ball.

20 Claims, 9 Drawing Sheets

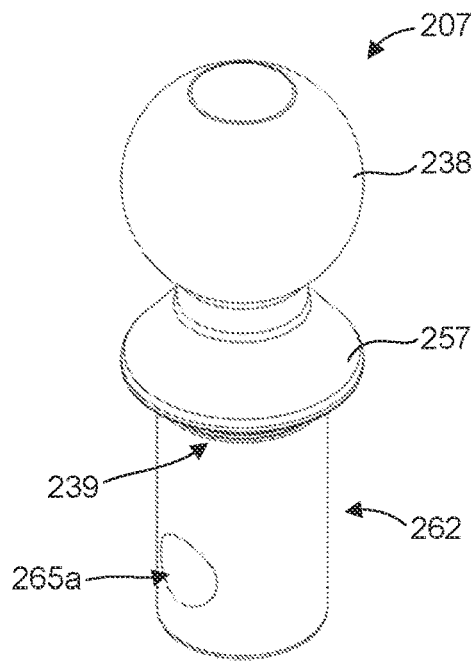
FIG. 7A
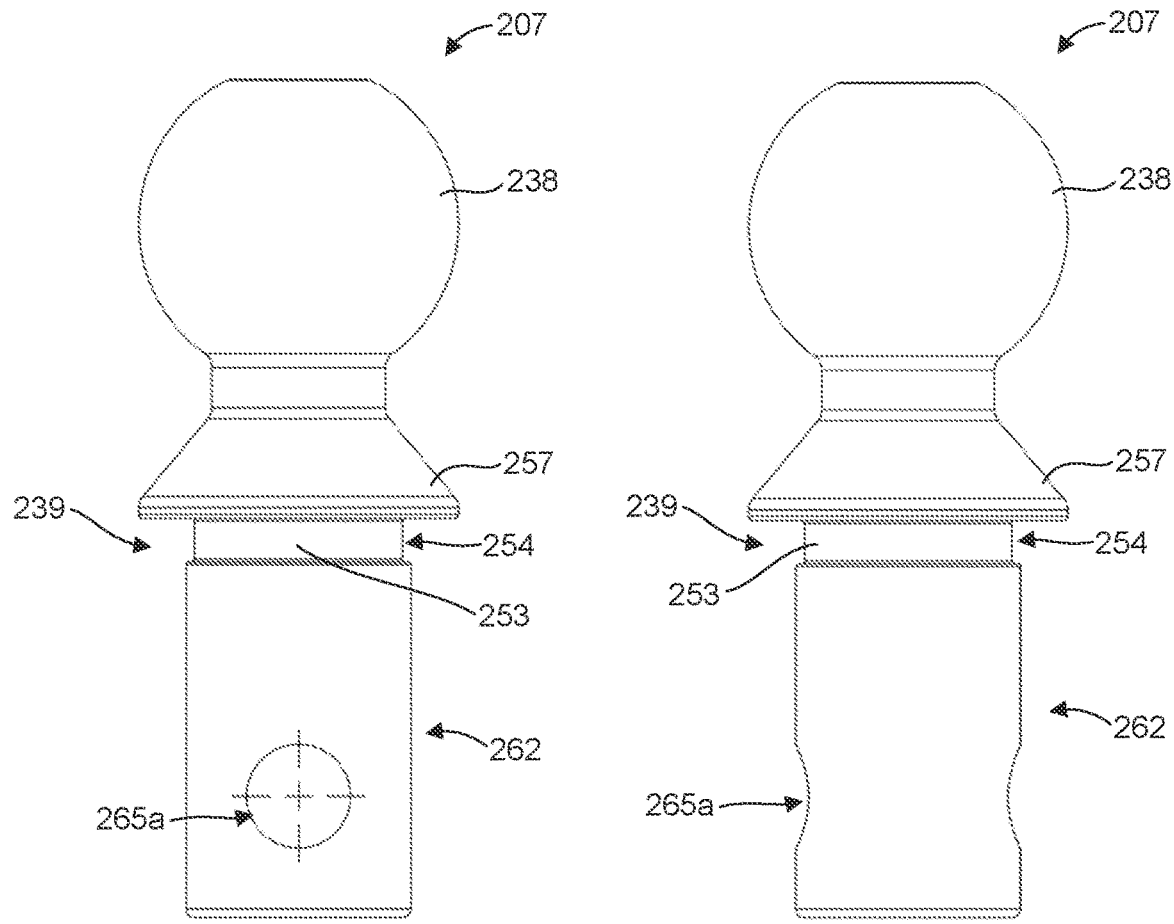
FIG. 7B
FIG. 7C

LOAD MEASURING HITCH ASSEMBLY FOR MEASURING LOADS APPLIED BY A TRAILER ON A TOW VEHICLE

PRIORITY DATA

This application claims the benefit of U.S. Provisional Application Ser. No. 63/184,763, filed on May 5, 2021, which is incorporated herein by reference in its entirety.

FIELD OF THE INVENTION

The present invention relates generally to trailer hitch devices, systems, and associated methods. Accordingly, the present invention involves the mechanical arts field.

BACKGROUND OF THE INVENTION

When towing a trailer behind a vehicle, one factor that can significantly affect safety is the hitch or tongue weight (i.e., static downward force) that the trailer applies to the hitch of the tow vehicle. If the hitch or tongue of the trailer does not apply enough downward force to the tow vehicle hitch, a dangerous condition called trailer sway could result. If the hitch or tongue of the trailer applies too much downward force to the tow vehicle hitch, then the rear tires of the tow vehicle can be overloaded, thus pushing the rear of the vehicle around and compromising steering and/or braking of the tow vehicle. A generally acceptable tongue weight for a "bumper pull" trailer is somewhere between 9% and 15% of the gross trailer weight (GTW), and a generally acceptable hitch weight for a "bed mount" (e.g., gooseneck) trailer is somewhere between 15% and 25% of the GTW. In addition to using the GTW for purposes of achieving a safe tongue weight, maintaining GTW within applicable trailer and tow vehicle manufacturer specified limits is another important factor in towing safety. Determining the GTW typically involves weighing the trailer, such as at a truck stop weigh station.

SUMMARY OF THE INVENTION

Load measuring hitch assemblies are provided. In one embodiment, a load measuring hitch assembly can include a body portion operable to facilitate coupling the load measuring hitch assembly to a tow vehicle. Additionally, the assembly can include a hitch ball coupled to the body portion. The hitch ball can include a ball operable to facilitate coupling the load measuring hitch assembly to a trailer. The hitch ball can also include a lower portion coupled to the body portion in a fixed relationship. The hitch ball can further include an instrument portion free to deflect due to at least one of a vertical or a horizontal force acting on the ball. In addition, the hitch ball can include one or more force sensors operably coupled to the instrument portion to measure a force on the instrument portion in at least one measurement axis, thereby facilitating determining a magnitude of the at least one of the vertical or the horizontal force acting on the ball.

In other embodiments, there are provided load measuring hitch systems. In still other embodiments, there are provided methods of measuring loads applied by a trailer on a tow vehicle.

BRIEF DESCRIPTION OF THE DRAWINGS

FIG. 7A illustrates a perspective view of a hitch ball of the load measuring hitch assembly of FIGS. 4A and 4B, in accordance with an example of the present disclosure.

FIGS. 7B and 7C illustrate side views of the hitch ball of FIG. 7A.

DETAILED DESCRIPTION OF THE INVENTION

Definitions

Figure 1:
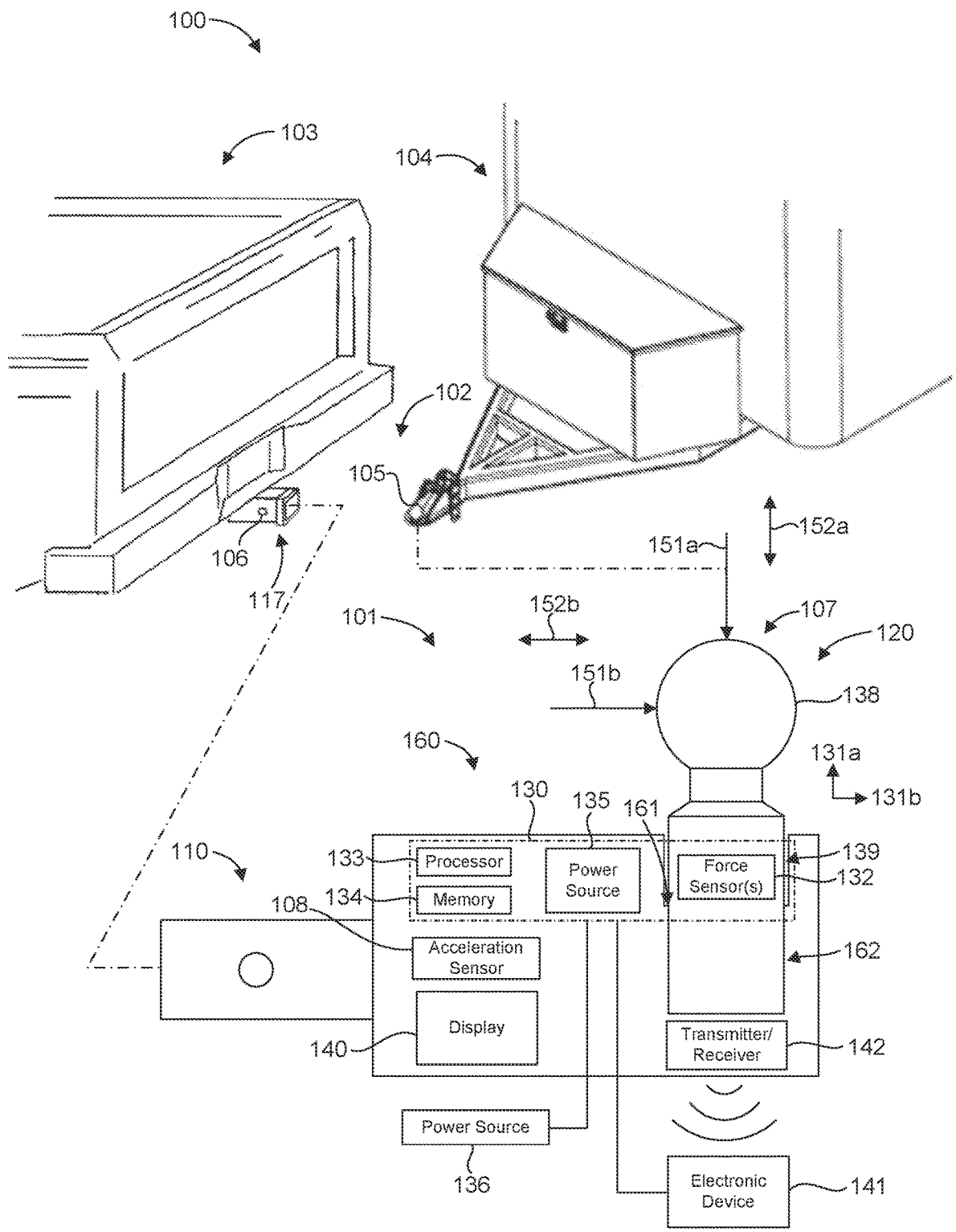
FIG. 1 illustrates a trailer hitch system for measuring hitch loads applied by a trailer, in accordance with an example of the present disclosure.

In describing and claiming the present invention, the following terminology will be used in accordance with the definitions set forth below.

The singular forms "a," "an," and, "the" include plural referents unless the context clearly dictates otherwise.

As used herein, the term "about" is used to provide flexibility to a numerical range endpoint by providing that a given value may be "a little above" or "a little below" the endpoint.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the composition's nature or characteristics would be permissible if present under the "consisting essentially of" language, even though not expressly recited in a list of items following such terminology. When using an open ended term, like "comprising" or "including," it is understood that direct support should also be afforded to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein. The term "coupled," as used herein, is defined as directly or indirectly connected in an electrical or nonelectrical manner. Objects or structures described herein as being "adjacent to" each other may be in physical contact with each other, in close proximity to each other, or in the same general region or area as each other, as appropriate for the context in which the phrase is used. Occurrences of the phrase "in one embodiment," or "in one aspect," herein do not necessarily all refer to the same embodiment or aspect.

As used herein, the term "about" is used to provide flexibility to a numerical range endpoint by providing that a given value may be "a little above" or "a little below" the endpoint. However, it is to be understood that even when the term "about" is used in the present specification in connection with a specific numerical value, that support for the exact numerical value recited apart from the "about" terminology is also provided.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually. This same principle applies to ranges reciting only one numerical value as a minimum or a maximum. Furthermore, such an interpretation should apply regardless of the breadth of the range or the characteristics being described.

The Invention

Figure 2:
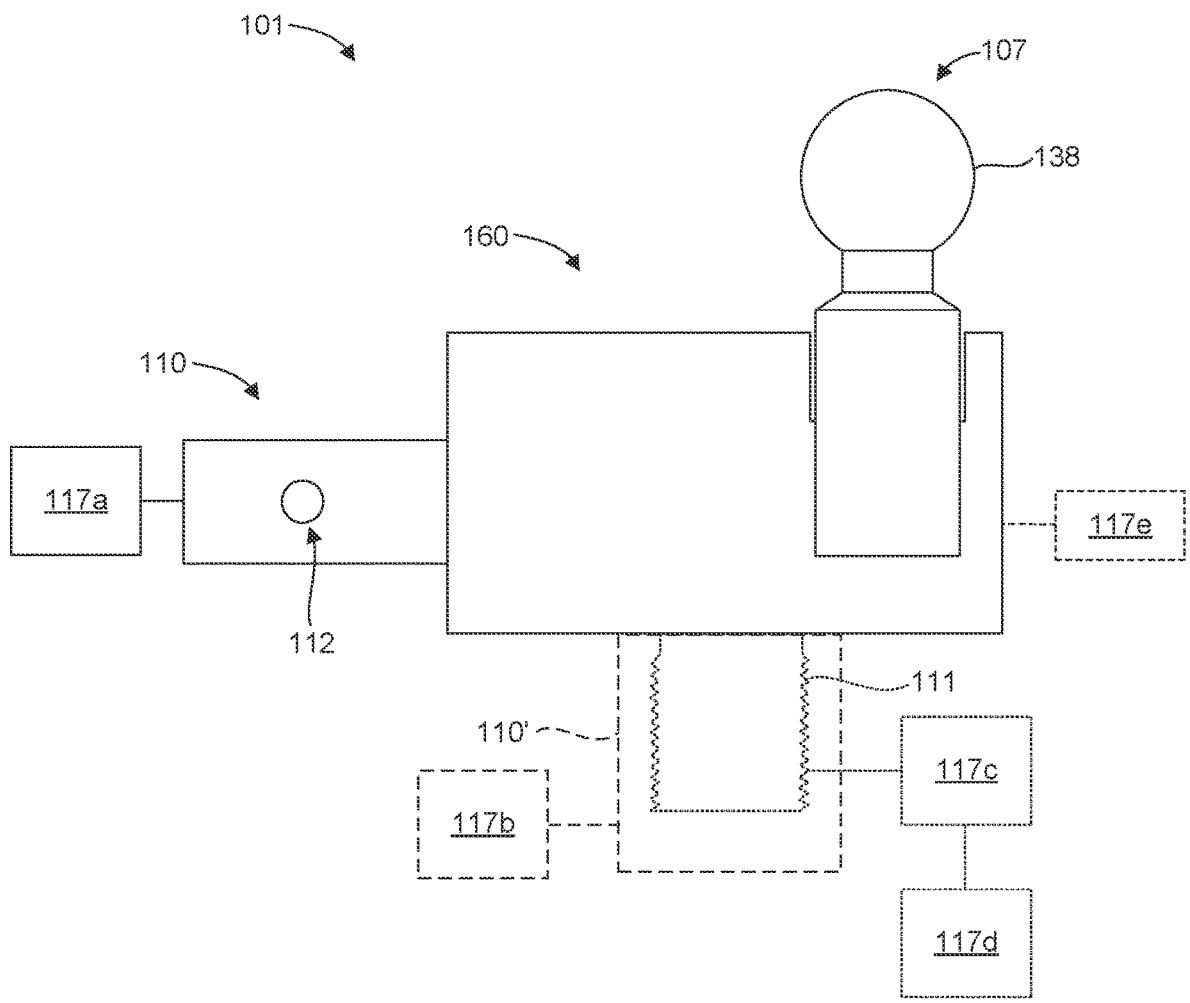
FIG. 2 is a schematic side cross-section view of a load measuring hitch assembly of the trailer hitch system of FIG. 1, in accordance with an example of the present disclosure.

With reference to FIG. 1, illustrated is a trailer hitch system 100 for measuring hitch loads (e.g., vertical loads, such as ball weight, pin weight, or tongue weight, and horizontal or lateral loads, such as fore/aft loads) applied by a trailer, in accordance with an example of the present disclosure. In general, the trailer hitch system 100 can include a load measuring hitch assembly 101 operable to couple with a tow vehicle 103. In addition, the trailer hitch system 100 can include a trailer 104 operable to couple to the tow vehicle 103 via the load measuring hitch assembly 101. The load measuring hitch assembly 101 is schematically illustrated in FIGS. 1 and 2.

The load measuring hitch assembly 101 can be included in a load measuring hitch system 102, which can also include an attachment structure 117 operable to be associated with the tow vehicle 103 (FIG. 1) to facilitate coupling the load measuring hitch assembly 101 to the tow vehicle 103. In one aspect, the load measuring hitch assembly 101 can be adapted to serve as a hitch ball or ball mount for a variety of different hitch configurations. For example, the attachment structure 117 can be any typical horizontally-oriented hitch receiver, such as a standard 2½", 2", or 1¼" size square hitch receiver for receiving hitch components (e.g., drawbars) for "bumper pull" style hitches. In some examples, the load measuring hitch assembly 101 can include a hitch portion 110, which can be configured to interface with the attachment structure 117 to facilitate coupling the load measuring hitch assembly 101 to the tow vehicle 103.

The load measuring hitch assembly 101 can include a support structure or body portion 160, which can facilitate coupling the load measuring hitch assembly 101 to the tow vehicle 103 (e.g., via the hitch portion 110 and the attachment structure 117). In some examples, the hitch portion 110 and the body portion 160 can be integrally formed with one another and/or permanently attached to one another (e.g., formed from the same block or billet of material and/or welded to one another). In other examples, the hitch portion 110 and the body portion 160 can be removably attached to one another (e.g., via a fastener).

The load measuring hitch assembly 101 can include a ball portion 120, which can have a hitch ball 107 to facilitate coupling the load measuring hitch assembly 101 to the trailer 104. For example, the hitch ball 107 (e.g., a goose ball, a ball mount, etc.) can be configured to engage with a coupling device 105 of the trailer 104 (e.g., a gooseneck, a tongue, etc.). In one aspect, the hitch ball 107 can include a ball 138 and a lower portion 162. The ball 138 can be configured to interface with the coupling device 105 of the trailer 104 (e.g., a trailer tongue, gooseneck, etc.). The ball 138 and the lower portion 162 can be separate and distinct structures coupled to one another (i.e., rigidly and fixedly coupled, such as by a threaded coupling interface) or the ball 138 and the lower portion 162 can form a single, monolithic structure. In either case, the hitch ball 107 can be a single structure comprised of multiple component parts or portions that remain in a fixed relationship to one another.

As illustrated in FIG. 1, the hitch ball 107 can be coupled to the body portion 160. In one aspect, the lower portion 162 of the hitch ball 107 can be coupled to the body portion 160 in a fixed relationship (e.g., fixed in translation and rotation). For example, the body portion 160 can include or define a hitch ball opening or socket 161 that can receive a lower portion 162 of the hitch ball 107 and facilitate coupling the hitch ball 107 to the body portion 160. The hitch ball opening 161 can be a blind-hole (as illustrated) or a through-hole. The lower portion 162 of the hitch ball 107 can be disposed at least partially in the hitch ball opening 161 and can have a sufficiently tight fit (e.g., a press fit, a location fit, an interference fit, a transition fit, etc.) with the body portion 160 to minimize or avoid substantial relative movement between the lower portion 162 of the hitch ball 107 and the body portion 160 (e.g., a translationally and rotationally fixed coupling). The hitch ball opening 161 and the lower portion 162 of the hitch ball 107 can have any suitable shape or geometry, such as a cylindrical shape, a cuboid shape, etc. In some examples, the lower portion 162 of the hitch ball 107 can be maintained or secured in the hitch ball opening 161 with a pin, a rod, a clip, etc., which can also serve to maintain the fixed relationship of the lower portion 162 and the body portion 160. In some examples, the hitch ball opening 161 can be at least partially defined by a threaded interface configured to engage a threaded interface of the lower portion 162 of the hitch ball 107. In some examples, the hitch ball opening 161 can be a through-hole and the lower portion 162 of the hitch ball 107 can be threaded to facilitate coupling to the body portion 160 with a fastener, such as a nut. In one aspect, the hitch ball 107 can be interchanged with another hitch ball having a different diameter ball 138 to properly fit a trailer tongue or to replace a damaged hitch ball. In some examples, the ball 138 can be removable from the lower portion 162 of the hitch ball 107 to facilitate removing or replacing only the ball 138 instead of the entire hitch ball 107.

The hitch ball 107 can also include an instrument portion 139 free to deflect in at least one direction due to a force 151a, 151b acting on the ball 138 in at least one direction 152a, 152b. The instrument portion 139 can be located between the ball 138 and the lower portion 162 of the hitch ball 107. In one aspect, the translationally and rotationally fixed relationship of the lower portion 162 of the hitch ball 107 and the body portion 160 can provide a cantilever type support for the instrument portion 139 and the ball 138.

The load measuring hitch assembly 101 can also include a load measurement device 130 operable to determine a force in at least one measurement axis 131a, 131b, which can sense vertical and/or horizontal forces 151a, 151b on the ball 138 as discussed in more detail below. The measurement axes 151a, 151b can be in any suitable relationship with one another, such as orthogonal. The load measurement device 130 can comprise any suitable type of load measurement device or mechanism described herein. For example, the load measurement device 130 can comprise one or more force sensors 132 (e.g., a load cell or a force transducer, such as a strain gauge). The force sensor(s) 132 can be coupled to the instrument portion 139 and can be operable to measure a force on the instrument portion 139 in at least one direction (e.g., parallel to at least one measurement axis 131a, 131b), thereby facilitating determining a magnitude of at least one force 151a, 151b acting on the ball 138 in at least of the vertical or horizontal directions 152a, 152b. By directly instrumenting the hitch ball 107 with the force sensor(s) 132, the hitch ball 107 itself can serve as a type of load cell to determine the magnitude of at least one of the forces 151a, 151b applied by the trailer 104 on the ball 138.

In some embodiments, the force sensor(s) 132 can be operable to measure force in at least two orthogonal directions (e.g., orthogonal measurement axes 131a, 131b), which may or may not be oriented parallel to one or both of the vertical or horizontal directions 152a, 152b. In some examples, at least one of the measurement axes 131a, 131b can be parallel to the vertical or the horizontal direction 152a, 152b. For example, the measurement axis 131a can be parallel to the vertical direction 152a and the measurement axis 131b can be parallel to the horizontal direction 152b. Such alignment of the measurement axes 131a, 131b with the vertical and horizontal directions 152a, 152b can simplify relating the measured force in the instrument portion 139 of the hitch ball 107 with the vertical and horizontal forces applied to the ball 138. The force sensor(s) 132 can be arranged in any suitable configuration (e.g., one or more strain gauges in any suitable configuration known in the art, such as any Wheatstone bridge configuration) operable to detect or measure forces in at least two measurement axes 131a, 131b, which can be used to determine the magnitude of one or more forces 151a, 151b acting on the ball 138 in at least one direction 152a, 152b.

In general, the load measurement device 130 (e.g., the force sensor(s) 132) can be operably coupled to the hitch ball 107 to facilitate determining a magnitude of a force 151a, 151b acting on the hitch ball 107 (e.g., through the trailer interface with the ball 138) in at least one of two directions 152a, 152b (e.g., vertical and horizontal directions). For example, when a force 151a, 151b is applied to the ball 138, the load measurement device 130 (e.g., the force sensor(s) 132) can strain or deflect as a result of the applied force transferred to the load measurement device 130. The vertical force 151a can represent a tongue weight of the trailer 104. The horizontal force 151b may be applied by the trailer 104 as the tow vehicle 103 tows the trailer 104. Thus, a magnitude of the horizontal force 151b is applied by the tow vehicle 103 to the trailer 104 in order to accelerate the trailer 104. In one aspect, a known magnitude of the horizontal force 151b can be used to determine the gross weight of the trailer 104. For example, the trailer hitch system 100 can include an acceleration sensor 108 operable to determine a magnitude of acceleration (e.g., of tow vehicle 103 and the trailer 104) in the horizontal direction 152b. During acceleration of the tow vehicle 103 and the trailer 104, the magnitude of the horizontal force 151b and the magnitude of the acceleration in the horizontal direction 152b can be measured or otherwise determined by the load measurement device 130 and the acceleration sensor 108, respectively. According to Isaac Newton's Second Law of Motion, the net force on an object is equal to the mass of the object multiplied by the acceleration of the object. Thus, the gross mass of the trailer 104 can be determined by dividing the magnitude of the horizontal force 151b by the magnitude of the acceleration in the horizontal direction 152b. Similarly, the gross weight of the trailer 104 can be determined by multiplying the gross mass of the trailer 104 by the acceleration due to gravity (which may be an assumed typical value or a more exact value based on the actual geographical location or a measurement).

In one aspect, the acceleration sensor 108 can include one or more acceleration sensors that can be configured to measure acceleration in one or more axes or directions (e.g., a horizontal axis and, optionally, a vertical axis or direction). In some examples, acceleration can be measured at relatively low vehicle speeds (e.g., less than or equal to about 30 mph to minimize the effect of aerodynamic loads (e.g., air/wind resistance) on the calculated trailer mass. Vehicle speed can be obtained from the tow vehicle 103 (e.g., from an engine control unit (ECU) of the tow vehicle 103) and/or determined using data from the acceleration sensor 108. In some examples, acceleration can be measured when the tow vehicle 103 and the trailer 104 are on a suitably horizontal or "level" surface (e.g., less than or equal to about 5% gradient to minimize the effect of gravity on the calculated trailer mass. The angle of the tow vehicle 103 and the trailer 104 relative to a horizontal plane (and/or a vertical plane (e.g., the direction of gravity)) can be determined using data from the acceleration sensor 108. An acceleration sensor as disclosed herein can include any suitable type of acceleration sensor or accelerometer known in the art, such as a capacitive MEMS acceleration sensor, a piezoresistive acceleration sensor, a piezoelectric acceleration sensor, etc. In some examples, the acceleration sensor 108 can be included in an inertial measurement unit (IMU), which can be utilized to provide a variety of data for the relevant calculations discussed herein.

The load measurement device 130 can include any suitable mechanical, electrical, and/or electromechanical device that can facilitate a determination of the magnitude of the force 151a, 151b acting on the hitch ball 107. For example, the load measurement device 130 can include a processor 133 and/or memory 134 to determine the magnitude of the load on the hitch ball 107. The processor 133 and/or memory 134 can be powered by a power source 135 (e.g., a battery) included in the load measurement device 130 and/or the processor 133 and/or memory 134 can be powered by a remote power source 136, which may be located on or otherwise associated with the tow vehicle 103 or the trailer 104. In one aspect, the acceleration sensor 108 can be operably coupled to the processor 133 and/or memory 134 to facilitate determining the gross weight of the trailer 104, as described above. The acceleration sensor 108 can be in any suitable location, such as located on or otherwise associated with the load measuring hitch assembly 101 (e.g., the body portion 160, the ball portion 120, etc.), the tow vehicle 103 (e.g., an add-on or existing sensor of the tow vehicle), or the trailer 104. In some examples, the load measuring hitch assembly 101 can include the acceleration sensor 108.

The memory 134 can be of any suitable type, such as random-access memory (RAM), read only memory (ROM), flash memory, a solid-state drive, a memory card, a hard drive, an optical disk, a floppy disk, a magnetic tape, or any other memory components. The memory 134 can store instructions. The processor 133 can be operably coupled to the memory 134. In some examples, the processor 133 can execute the instructions to cause the processor 133 to receive force data generated by the force sensor(s) 132. The processor 133 can execute the instructions to cause the processor 133 to determine a magnitude of at least one of a vertical force 151a or a horizontal force 151b acting on the hitch ball 107 (e.g., through the trailer interface with the ball 138) based on the force data. The magnitude of the vertical force 151a may represent the tongue weight of the trailer 104. If the magnitude of the horizontal force 151b is determined, the processor 133 can also execute the instructions to cause the processor 133 to receive acceleration data generated by the acceleration sensor 108. For example, the acceleration sensor 108 can detect an acceleration of the load measuring hitch assembly 101 in the horizontal direction 152b and can output a value indicating the acceleration to the processor 133. The acceleration sensor 108 can output the detected acceleration as an analog value (e.g., as analog voltage) or digitally output the detected acceleration. When an analog value is output from the acceleration sensor 108, an analog-to-digital (A/D) conversion of the analog acceleration value to a digital value can be performed to facilitate use of the acceleration data by the processor 133. The processor 133 can execute the instructions to cause the processor 133 to determine a magnitude of an acceleration in the horizontal direction 152b based on the acceleration data. The processor 133 can further execute the instructions to cause the processor 133 to determine a gross mass of the trailer 104 by dividing the magnitude of the force 151b by the magnitude of the acceleration in the horizontal direction 152b. Additionally, the processor 133 can execute the instructions to cause the processor 133 to determine a gross weight of the trailer 104 by multiplying the gross mass of the trailer 104 by the acceleration due to gravity (which may be an assumed typical value stored in the memory 134).

The term "executable" can mean a program file that is in a form that can be executed by the processor 133. For example, a program in a higher-level language can be compiled into machine code in a format that can be loaded into a random-access portion of the memory 134 and executed by the processor 133, or source code can be loaded by another executable program and interpreted to generate instructions in a random-access portion of the memory 134 to be executed by processor 133. The executable program can be stored in any portion or component of the memory 134.

In accordance with one embodiment of the present invention, a computer implemented method is disclosed for determining a tongue weight of a trailer and/or a gross weight of the trailer. The method can comprise receiving force data generated by the force sensor(s) 132. The method can also comprise determining a magnitude of at least one of a vertical force 151a or a horizontal force 151b acting on the hitch ball 107 (e.g., through the trailer interface with the ball 138) based on the force data. The magnitude of the vertical force 151a may represent the tongue weight of the trailer 104. If the magnitude of the horizontal force 151b is determined, the method can comprise receiving acceleration data generated by the acceleration sensor 108. The method can further comprise determining a magnitude of an acceleration in the horizontal direction 152b based on the acceleration data. The method can also comprise determining a gross mass of the trailer 104 by dividing the magnitude of the force 151b by the magnitude of the acceleration in the horizontal direction 152b. Additionally, the method can comprise determining a gross weight of the trailer 104 by multiplying the gross mass of the trailer 104 by the acceleration due to gravity (which may be an assumed typical value). It is noted that no specific order is required in this method, though generally in some embodiments, at least some of these method steps can be carried out sequentially or concurrently.

The load measurement device 130 (e.g., the force sensor(s) 132) can be operably associated with the hitch ball 107 to determine a magnitude of a force 151a, 151b acting on the hitch ball 107 (e.g., through the trailer interface with the ball 138) in at least one of the two directions 152a, 152b. For example, the force sensor(s) 132 can be coupled to the instrument portion 139 of the hitch ball 107. The forces 151a, 151b applied by the trailer 104 to the ball 138 can be transferred to body portion 160 (i.e., to the tow vehicle 103) through the instrument portion 139 of the hitch ball 107, which is free to deflect in response to the applied forces 151a, 151b on the hitch ball 138. This deflection can be sensed by the force sensor(s) 132 in at least one measurement axis 131a, 131b and related to the force in the instrument portion 139. The geometric relationship between the ball 138, the instrument portion 139, and the force sensor(s) 132, the dimensions of the instrument portion 139, as well as any angular offset in the orientation of the directions 152a, 152b and the measurement axes 131a, 131b, can be accounted for in determining the magnitude of the forces 151a, 151b from the force data sensed by the load measurement device 130 (e.g., the force sensor(s) 132).

In one aspect, the load measuring hitch assembly 101 can include a display 140 for displaying or otherwise indicating force or load information obtained by the load measurement device 130. For example, the display 140 can be configured to indicate the magnitude of the force 151a, 151b (e.g., as vertical and horizontal force magnitude components and/or as a total force magnitude), as determined by the load measurement device 130. Thus, the display 140 can be an analog and/or digital display of a sensor or load cell (e.g., a strain gauge load cell) located local to the load measuring hitch assembly 101 and/or a separate display device distinct from the load measuring hitch assembly 101 (e.g., a remote display associated with the tow vehicle and/or a mobile electronic device). The display 140 can be wired and/or wirelessly connected to the load measurement device 130. In some examples, the load measuring hitch assembly 101 can include a transmitter/receiver 142 such that load data pertaining to the magnitude of the force 151a, 151b on the hitch ball 107 can be wired or wirelessly transmitted to a remote electronic device 141, such as a display. Thus, in some examples, the remote electronic device 141 can include a display to enable displaying load measurement information at a location remote from the hitch ball 107 and the body portion 160. For example, a display 140 can be located inside the tow vehicle 103 and can receive load data for display to the driver or operator of the vehicle. In one aspect, the display 140 can comprise a screen of a mobile device, such as a smartphone or a tablet.

The display 140 can be any suitable type of display, such as an analog or a digital display. The display 140 can be coupled to the load measurement device 130 in any suitable manner such that the display can properly indicate the magnitude of the load on the hitch ball 107. In one aspect, the display can be electrically coupled to the load measurement device 130. The load measurement device 130 and/or the display 140 can therefore include any suitable electrical device that can facilitate the determination and/or display of the magnitude of the load on the hitch ball 107. For example, the load measurement device 130 and/or the display 140 can include a processor and/or memory to determine the magnitude of the load on the hitch ball 107. In another aspect, the display 140 can be calibrated to indicate the magnitude of the load on the hitch ball 107, based on electrical input from the load measurement device 130. In a particular aspect, therefore, the display 140 can be integral with the load measurement device 130 in determining the magnitude of the load on the hitch ball 107. It should be recognized that the display 140 can be disposed in any suitable location and can be in communication with the load measurement device 130 via any suitable means. In some examples, a display 140 can be associated with any suitable structure of the load measuring hitch assembly 101, such as the body portion 160, as shown in FIG. 1.

In one aspect, the load measuring hitch assembly 101 can include the transmitter/receiver 142 to facilitate communication with a remote electronic device 141, such as a computer. In some examples, the transmitter/receiver 142 can be operably coupled to at least one electronic device of the load measurement device 130 (e.g., the processor 133 and computer memory 134) and/or the acceleration sensor 108 to facilitate communicating load and/or acceleration information with the remote electronic device 141 (e.g., a remote display). In some examples, the transmitter/receiver 142 can be configured to communicate force measurements or data to the remote electronic device 141, which can include the processor 133 and computer memory 134 (e.g., an ECU of the tow vehicle 103) to determine the magnitude of the load on the hitch ball 107 at a location remote from the hitch ball 107 and the body portion 160. In one aspect, a mobile device, such as a smartphone or a tablet, can include a processor and/or memory used to determine the magnitude of the load on the hitch ball 107, such as by executing an application. In some examples, the acceleration sensor 108 can be associated with the tow vehicle 103 (e.g., an existing acceleration sensor of the tow vehicle 103).

The transmitter/receiver 142 can be configured for wired and/or wireless communication with the remote electronic device 141. For example, the transmission of load or force data can be via vehicle wiring (e.g., taillight wiring, trailer light/brake control wiring, etc.), which can be utilized to communicate load or force data via a signal to the tow vehicle 103 (e.g., the vehicle interior, the ECU, etc.). In another aspect, a wireless transmission of load or force data can be accomplished via a Bluetooth connection, a cellular network, LAN, WIFI, an RF signal, an infrared signal, or any other suitable type of wireless network, connection, and/or protocol. In one aspect, the transmitter/receiver 142 can transmit load or force data to an electronic device 141 or location remote from the load measuring hitch assembly 101, such as to a remote display, a mobile device (e.g., a smart phone, tablet, laptop, etc.), an ECU of the tow vehicle 103, etc. Thus, the load or force data can be communicated to any suitable location, in or out of the vehicle. In one aspect, the load measurement device 130, the display 140, and/or the transmitter/receiver 142, or any other related item or device, such as a processor, memory, a battery, or an RF receiver, can be located in or on the load measuring hitch assembly 101.

The weight measuring hitch ball assembly 101 can be adapted to serve as a hitch ball or ball mount for a variety of different hitch configurations. Variations of the attachment structure 117 are illustrated as attachment structures 117a-e in FIG. 2. For example, the attachment structure 117a can be any typical horizontally-oriented hitch receiver, such as a standard 2½", 2", or 1¼" size square hitch receiver for receiving hitch components (e.g., drawbars) for "bumper pull" style hitches. In other examples, an attachment structure 117b can be any typical vertically-oriented hitch receiver, such as a square hitch receiver (typically aftermarket) or a round hitch receiver (typically OEM) for receiving bed-mount style hitches (e.g., gooseneck hitches). In one example, the weight measuring hitch ball assembly 101 can include a coupling feature 111 operable to couple the hitch ball assembly 101 to an attachment structure 117c (e.g., a draw bar) that facilitates coupling the assembly 101 to the tow vehicle 103. In this case, the attachment structure 117c can be configured to interface with an attachment structure 117d (e.g., a hitch receiver) attached to a tow vehicle. In another example, the attachment structure 117e can be a hitch or hitch portion (e.g., an above-bed attachment structure, such as an above-bed gooseneck hitch system) that attaches to a tow vehicle. In one aspect, the attachment structures 117a-e can be a portion of the tow vehicle 103, such that the assembly 101 is coupled directly to the tow vehicle 103. The coupling feature 111 can be or include any suitable coupling configuration known in the art, such as a threaded coupling feature (e.g., external threads or internal threads), a shaft, a rod, a hole, a recess, a groove, a pin, or any other feature suitable for coupling the assembly 101 to an attachment structure and/or a tow vehicle and maintaining structural integrity during towing. In one aspect, the coupling feature 111 can extend downward from the body portion 160 below the hitch ball 107, although any other suitable location and/or orientation of the coupling feature 111 is contemplated.

One benefit of the coupling feature 111 is that it enables the weight measuring hitch ball assembly 101 to be removably coupled to a given attachment structure 117a-e (e.g., a hitch or hitch portion, drawbar, hitch receiver, etc.) that is operable to facilitate coupling the assembly 101 to the tow vehicle 103. As will be apparent to one skilled in the art, coupling devices of trailers (e.g., goosenecks, trailer tongues, etc.) have a variety of sizes and can require differing hitch ball sizes to securely couple a trailer to a towing vehicle. Some standard hitch ball sizes can include 1⅞", 2", 2⁵⁄₁₆", and 3" diameters. Thus, an assembly 101 having a suitable ball 138 size can be selected for coupling with a given attachment structure 117a-e (e.g., a hitch or hitch portion, drawbar, hitch receiver, etc.) to accommodate a given size/configuration of trailer coupling device.

In one example, the body portion 160 can be configured to interface directly with the attachment structure 117e associated with a tow vehicle that facilitates coupling the weight measuring hitch ball assembly 101 to the tow vehicle. In another example, the weight measuring hitch ball assembly 101 can include a hitch portion 110, 110' configured to interface with the attachment structure 117a, 117b, respectively, associated with a tow vehicle that facilitates coupling the weight measuring hitch ball assembly 101 to the tow vehicle. In one example, the hitch portion 110 extends laterally from the body portion 160 on a lateral side of the hitch ball 107. In this case, the attachment structure 117a can comprise a hitch receiver. The hitch portion 110 can include a hole 112 or other suitable feature to facilitate securing the weight measuring hitch ball assembly 101 to the attachment structure 117a, such as with a pin or threaded fastener through the hole 112 of the assembly 101 and a hole 106 of the attachment structure 117a. In another example, the hitch portion 110' can be configured to interface with the attachment structure 117b associated with a tow vehicle that facilitates coupling the weight measuring hitch ball assembly 101 to the tow vehicle. In this example, the hitch portion 110' extends downward from the body portion 160 below the hitch ball 107. In this case, the attachment structure 117b can comprise a goose ball receiver socket mounted on or otherwise associated with a tow vehicle. In the above examples, the hitch portions 110, 110' can be permanently attached (e.g., integrally formed) with the body portion 160 or removably coupled to the body portion 160.

A method of measuring loads applied by a trailer on a tow vehicle can comprise operably coupling a load measuring hitch assembly as disclosed herein (e.g., the load measuring hitch assembly 101) to a tow vehicle. The method can also include engaging a coupling device of a trailer with the load measuring hitch assembly.

Although the trailer hitch system 100 includes what is generally referred to as a "hitch ball" throughout the present disclosure for coupling with a trailer, it should be recognized that the trailer hitch system can include any suitable form of coupling with a trailer. Aspects of the present disclosure that facilitate measuring loads on the load measuring hitch assembly 101 applied by the trailer 104 as disclosed herein can be incorporated into such coupling arrangements.

The load measuring hitch assembly 101 of FIGS. 1 and 2 has been shown and described as a generic representation of such an assembly. FIGS. 3A-9C include illustrations of various load measuring hitch assemblies and related components that are more specific examples of the generic assembly 101 of FIGS. 1 and 2. Thus, the description of the assembly 101 in FIGS. 1 and 2 may describe aspects of the various assemblies of FIGS. 3A-10C, as applicable, which may not be described with particular reference to FIGS. 3A-10C. Furthermore, certain specific aspects and features described in one example may be present in another example, although not specifically discussed with reference to that example.

Figure 3:
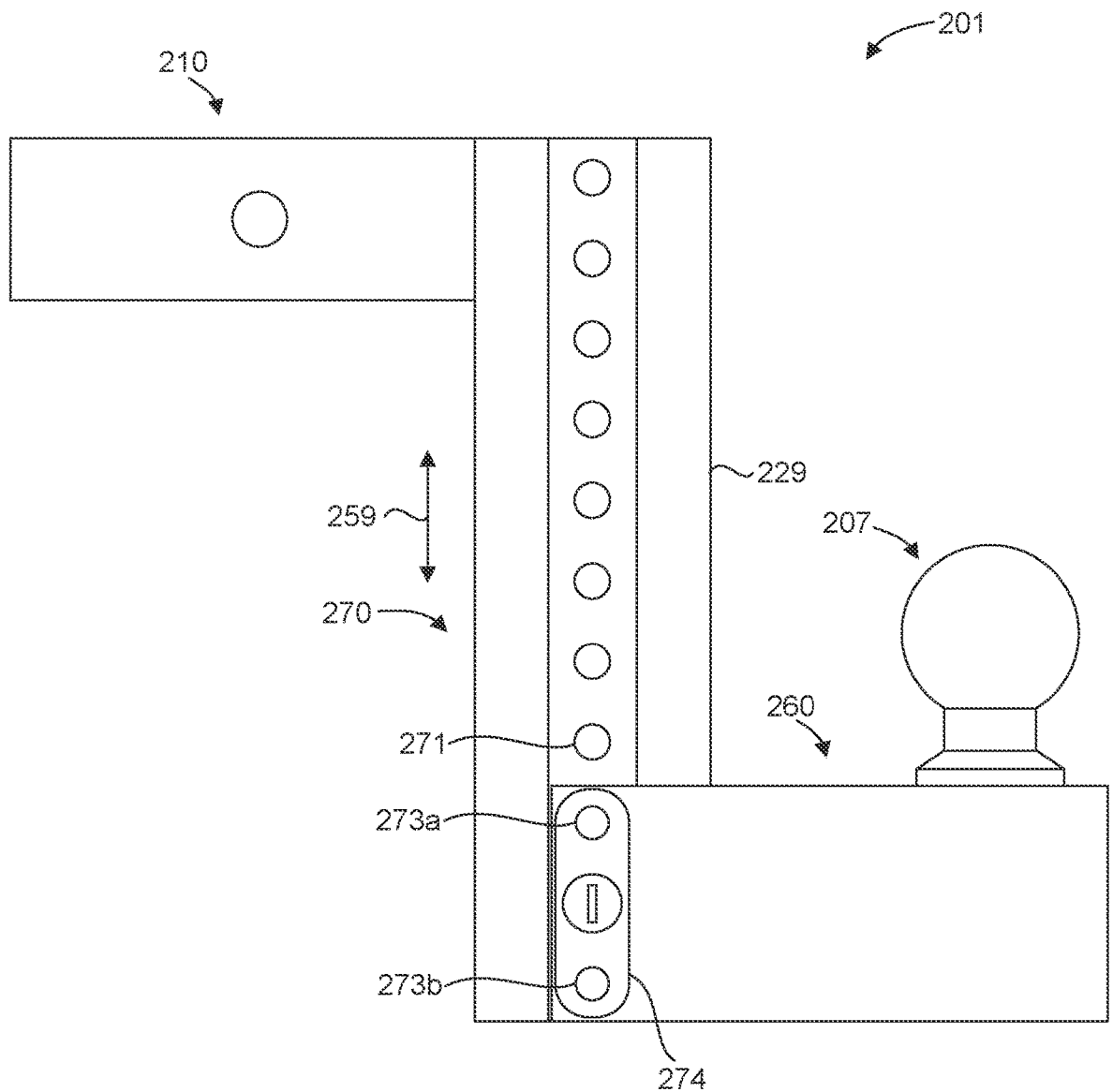
FIG. 3 illustrates a side view of a load measuring hitch assembly including a hitch portion, in accordance with example of the present disclosure.
Figure 4A:
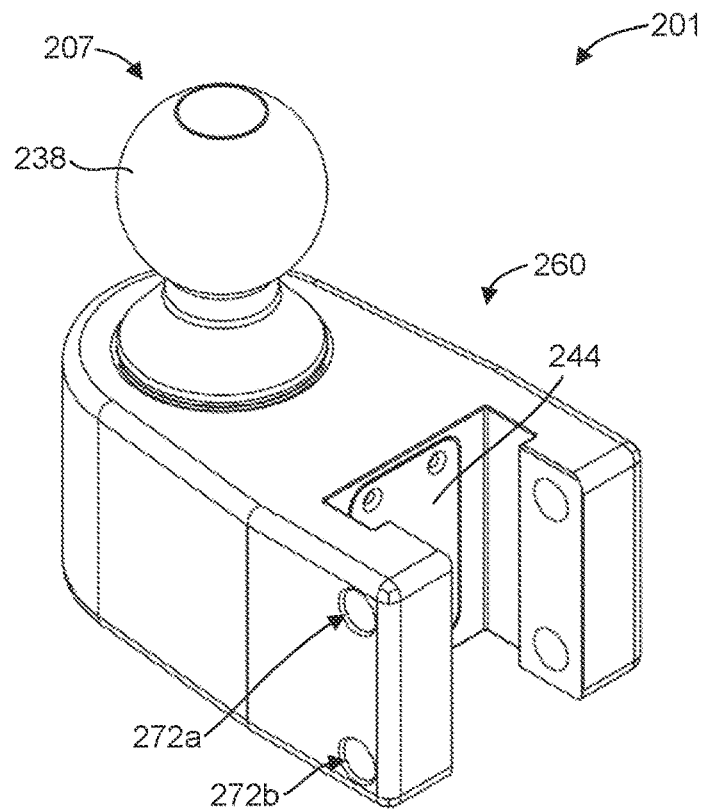
FIGS. 4A and 4B illustrate perspective views of the load measuring hitch assembly of FIG. 3, without a hitch portion, in accordance with an example of the present disclosure.
Figure 4B:
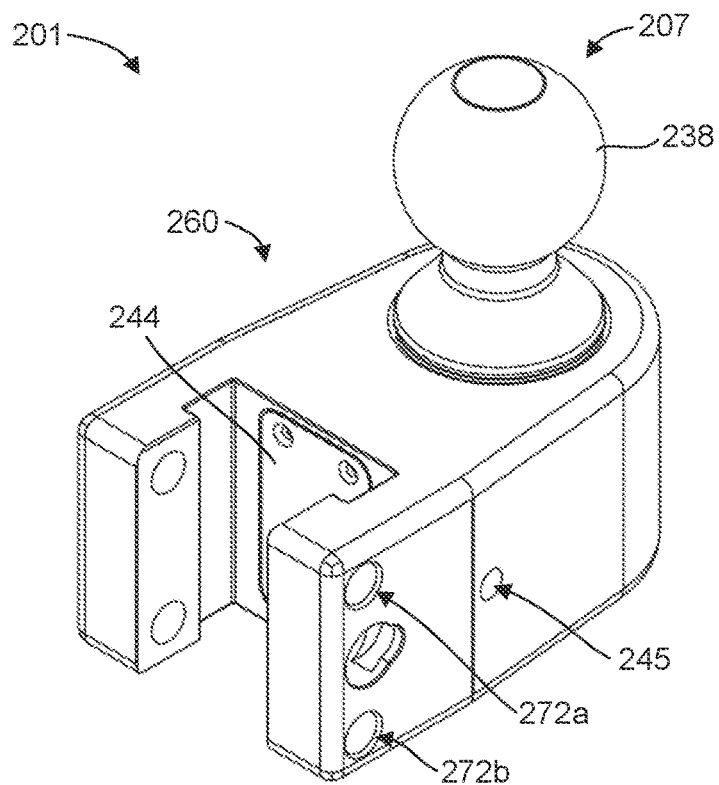
Figure 4C:
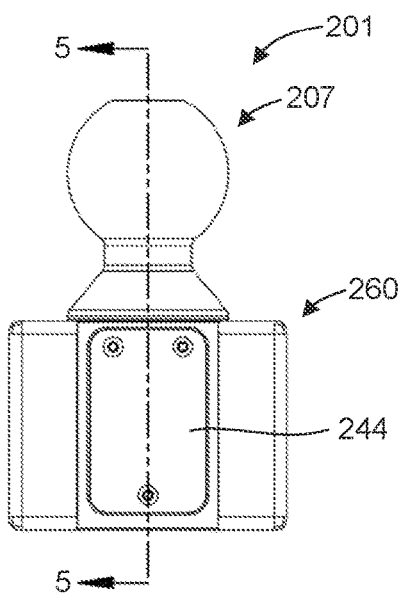
FIG. 4C illustrates an end view of the load measuring hitch assembly of FIGS. 4A and 4B.
Figure 5:
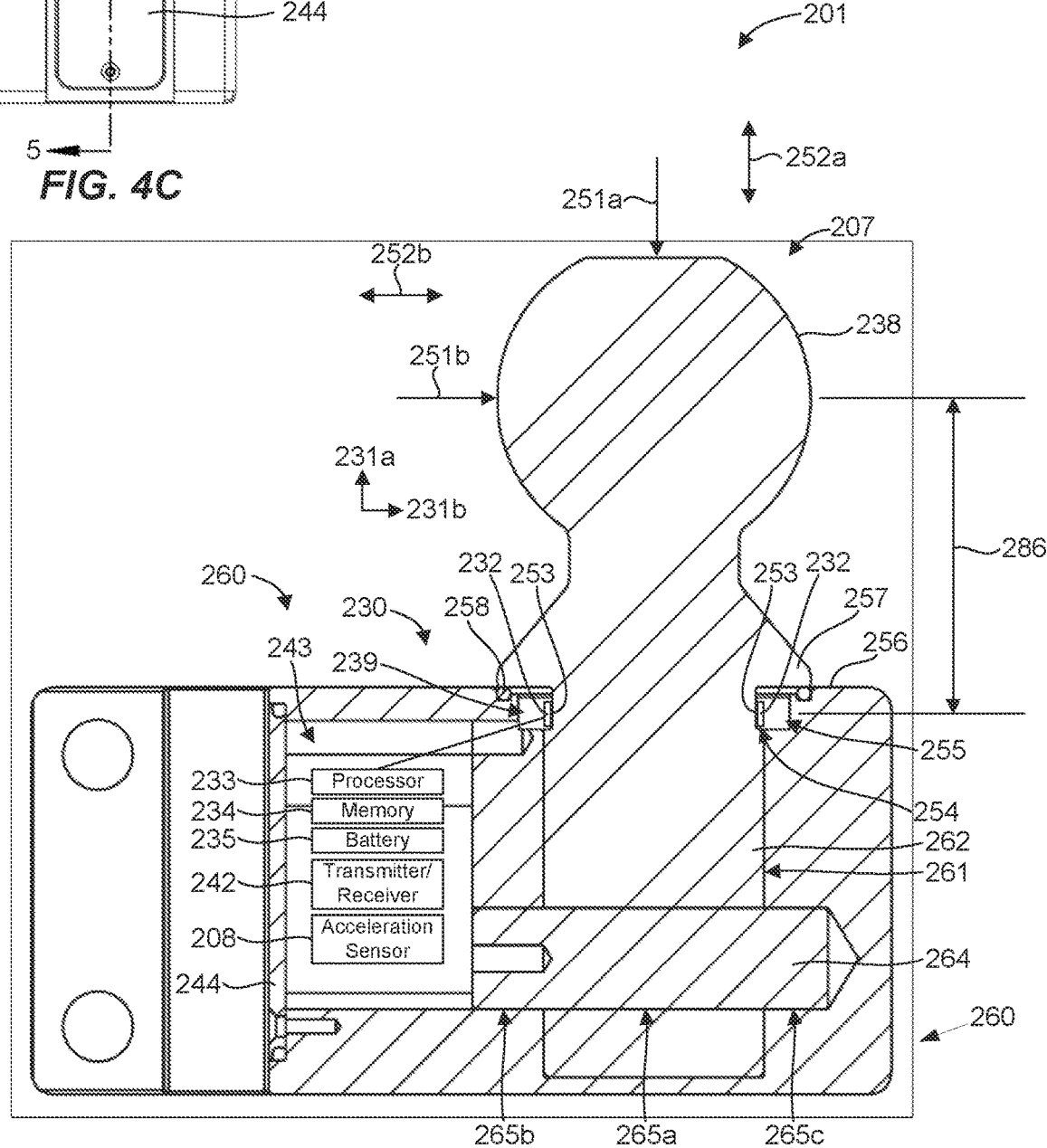
FIG. 5 illustrates a side cross-sectional view of the load measuring hitch assembly of FIGS. 4A and 4B.
Figure 8A:
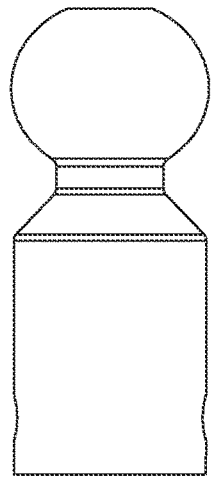
FIG. 8A illustrates a perspective view of a hitch ball of the load measuring hitch assembly of FIG. 6, in accordance with an example of the present disclosure.
Figure 8B:
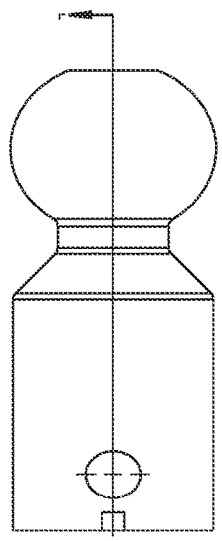
FIGS. 8B and 8C illustrate side views of the hitch ball of FIG. 8A.
Figure 8C:
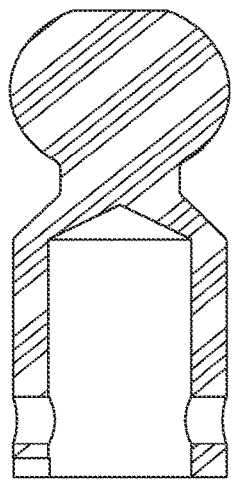

FIGS. 3-7C illustrate a load measuring hitch assembly 201 and related components in accordance with an example of the present disclosure. Specifically, FIG. 3 illustrates a side view of the load measuring assembly 201 with a hitch portion 210, FIGS. 4A and 4B illustrate perspective views of the load measuring hitch assembly 201, FIG. 4C is an end view of the load measuring hitch assembly 201, and FIG. 5 illustrates a side cross-sectional view of the load measuring hitch assembly 201. In addition, FIGS. 7A-7C illustrate various views of a hitch ball 207 of the load measuring hitch assembly 201. Further, FIGS. 8A-8C illustrate various views of a hitch ball 207 of the load measuring hitch assembly embodiment shown in FIG. 6.

The load measuring hitch assembly 201 can include a body portion 260 operable to facilitate coupling the load measuring hitch assembly 201 to a tow vehicle and a hitch ball 207 coupled to the body portion 260. The hitch ball 207 can include a ball 238 operable to facilitate coupling the load measuring hitch assembly 201 to a trailer. The hitch ball 207 can also include a lower portion 262 coupled to the body portion 260 in a fixed relationship. The hitch ball 207 can further include an instrument portion 239 free to deflect due to at least one of a vertical or a horizontal force 251a, 251b acting on the ball 238. In addition, the hitch ball 207 can include one or more force sensors 232 operably coupled to the instrument portion 239 to measure a force on the instrument portion 239 in at least one measurement axis 231a, 231b, thereby facilitating determining a magnitude of at least one of the vertical or the horizontal force 251a, 251b acting on the ball 238.

In one aspect, illustrated in FIG. 5, the body portion 260 can include or define a hitch ball opening or socket 261 that can receive a lower portion 262 of the hitch ball 207 and facilitate coupling the hitch ball 207 to the body portion 260.

The hitch ball opening 261 can be a blind-hole (as illustrated) or a through-hole. The lower portion 262 of the hitch ball 207 can be disposed at least partially in the hitch ball opening 261 and can have a sufficiently tight fit (e.g., a press fit, a location fit, an interference fit, a transition fit, etc.) with the body portion 260 to minimize or avoid substantial relative movement between the lower portion 262 of the hitch ball 207 and the body portion 260 (e.g., a translationally and rotationally fixed relationship). The hitch ball opening 261 and the lower portion 262 of the hitch ball 207 can have any suitable shape or geometry, such as a cylindrical shape (as in the illustrated example), a cuboid shape, etc. In some examples, the lower portion 262 of the hitch ball 207 can be maintained or secured in the hitch ball opening 261 with a pin, a rod, a clip, etc. to maintain a fixed relationship between the lower portion 262 of the hitch ball 207 and the body portion 260. In the illustrated example, the lower portion 262 of the hitch ball 207 can be secured to body portion 260 with a retention pin 264. The hitch ball 207 and the body portion 260 can have respective retention pin openings 265a, 265b operable to receive the retention pin 264. In some examples, the body portion 260 can have a retention pin opening 265c that allows the retention pin 264 to extend through the lower portion 262 of the hitch ball 207 and into the body portion 260. The retention pin 264 and the retention pin openings 265a-c can be sized to provide a sufficiently tight fit (e.g., a press fit, a location fit, an interference fit, a transition fit, etc.) with the lower portion 262 of the hitch ball 207 and the body portion 260 to minimize or avoid substantial relative movement between the retention pin 264 and both the lower portion 262 of the hitch ball 207 and the body portion 260.

In one aspect, the instrument portion 239 of the hitch ball 207 can be configured to interface with the force sensor(s) 232. For example, the instrument portion 239 can include or define a force sensor interface 253. The force sensor interface 253 can have any suitable shape or geometry, such as a cylindrical shape (as in the illustrated example), a cuboid shape, etc. In one aspect, the instrument portion 239 can be defined at least partially by a sensor recess 254 that forms or defines a reduced cross-sectional area portion of the hitch ball 207. In this case, the force sensor interface 253 can at least partially define the sensor recess 254. The locally reduced cross-sectional area provided in the region of the sensor recess 254 can ensure that the hitch ball 207 will predictably deflect at that location and therefore ensure that the force sensor(s) 232 will provide useful data. In the illustrated example, the body portion 260 can include a deflection accommodating recess or opening 255 to provide space or room about the instrument portion 239 and the force sensor(s) 232 to facilitate unrestricted deflection of the instrument portion 239 under the vertical and horizontal forces 251a, 251b applied to the ball 238. In this case, the instrument portion 239 and the force sensor(s) 232 can be located at least partially below a top surface 256 of the body portion 260. This configuration can provide protection for the force sensor(s) 232. For example, the hitch ball 207 can include a flange 257 extending outward below the ball 238 and configured to cover a top of the force sensor(s) 232 and the recess 255 such that the force sensor(s) 232 are located below the flange 257. In one aspect, a seal 258 can be disposed between the flange 257 and the body portion 260 to protect the force sensor(s) 232 from damage and environmental elements. The seal 258 can be sufficiently soft or flexible to facilitate unrestricted movement of flange 257 relative to the body portion 260 despite being located between the two components. In some examples, the instrument portion 239 can be at least partially located above the top surface 256 of the body portion 260.

With particular reference to FIG. 5, it can be observed that the ball 238 and the force sensor(s) 232 may be spatially separated from one another (e.g., in the vertical direction 252a by a distance 286). The location of the force sensor(s) 232 on the instrument portion 239 of the hitch ball 207 and the freedom of the instrument portion 239 to deflect under forces 251a, 251b applied to the ball 238 can enable the load measurement device 230 to sense the force transferred from the ball 238 to the force sensor(s) 232 in the measurement axes 231a, 231b. More specifically, the cantilevered ball 238 and instrument portion 239 can facilitate an unconstrained transfer of the force 251a, 251b applied to the ball 238 to the force sensor(s) 232, which can be sensed as force components in the measurement axes 231a, 231b. In general, therefore, the measured force components in the measurement axes 231a, 231b can be related to the force 251a, 251b acting on the ball 238 based on known geometry and engineering principles to determine the magnitudes of the vertical force 251a and the horizontal force 251b. In one aspect, the instrument portion 239 can be directly below the ball 238, which can simplify at least some of the calculations. In addition, the arrangement of the force sensor(s) 232 can be selected to simplify at least some of the calculations. For example, the measurement axes 231a, 231b can be oriented parallel to the respective vertical and horizontal directions 252a, 252b. By directly instrumenting the hitch ball 207 with the force sensor(s) 232, the hitch ball 207 itself can serve as a type of load cell to determine the magnitude of at least one of the forces 251a, 151b applied by a trailer on the ball 238.

In one aspect, the body portion 260 can be removably coupleable to a hitch portion 210 (FIG. 3). For example, the hitch portion 210 can include a vertical member 229 and the body portion 260 can be configured to interface with the vertical member 229. In one aspect, the vertical member 229 and the body portion 260 can be configured with complementary geometries to facilitate a stable engagement of the vertical member 229 and the body portion 260 when coupled to one another, such as via coupling pins 273a, 273b in coupling pin openings 272a, 272b (FIGS. 4A and 4B) in the body portion 260 and openings 271 in the vertical member 229. In one example, the vertical member 229 can have an I-shaped cross-section and the body portion 260 can have a C-shaped cross-sectional portion (FIGS. 4A and 4B) to mate with and engage at least a portion of the I-shaped cross-section of the vertical member 229. Such an interface configuration can provide torsional stability for mating the vertical member 229 and the body portion 260 components of the assembly 201. In one aspect, the coupling pins 273a, 273b can be coupled to one another via a connecting member 274 to facilitate simultaneous insertion or removal of the coupling pins 273a, 273b. The ability to removably couple the body portion 260 to the hitch portion 210 can enable swapping out hitch balls or incorporating the force measuring features disclosed herein with another hitch design.

In one aspect, the present example also includes features and structures that facilitate a vertical height adjustment of the hitch ball 207. These features can be used, for example, to position the hitch ball 207 at a suitable height for engaging a trailer when a hitch receiver on the tow vehicle would otherwise be too high. In particular, the vertical member 229 can be configured to allow adjustment of a height of the hitch ball 207 with respect to the hitch portion 210 in direction 259 by having an elongated length in direction 259 and multiple openings 271 along the length. In use, the coupling pins 273a, 273b can be removed from at least the openings 271 in the vertical member 229, and the body portion 260 can be moved vertically in direction 259. Once a desired height of the hitch ball 207 is achieved, the coupling pins 273a, 273b can be inserted into the nearest acceptable adjustment openings 271 through the respective coupling pin openings 272a, 272b to fix the relative position of the body portion 260 and the vertical member 229 and complete the height adjustment of the hitch ball 207.

In some examples, the body portion 260 can include a chamber 243 operable to house one or more electronic devices (e.g., a processor 233, memory 234, etc.) operably coupled to the force sensor(s) 232 to receive signals from the force sensor(s) 232. In one aspect, the chamber 243 can also house any other suitable electronic device or component disclosed herein, such as a battery 235, a transmitter/receiver 242, an acceleration sensor 208, etc. A removable cover 244 over the chamber 243 can provide access to the chamber 243 and provide protection for the contents of the chamber 243. An opening or hole 245 (FIG. 4B) in the body portion 260 can facilitate wired and/or wireless communication with the transmitter/receiver 242.

Figure 6:
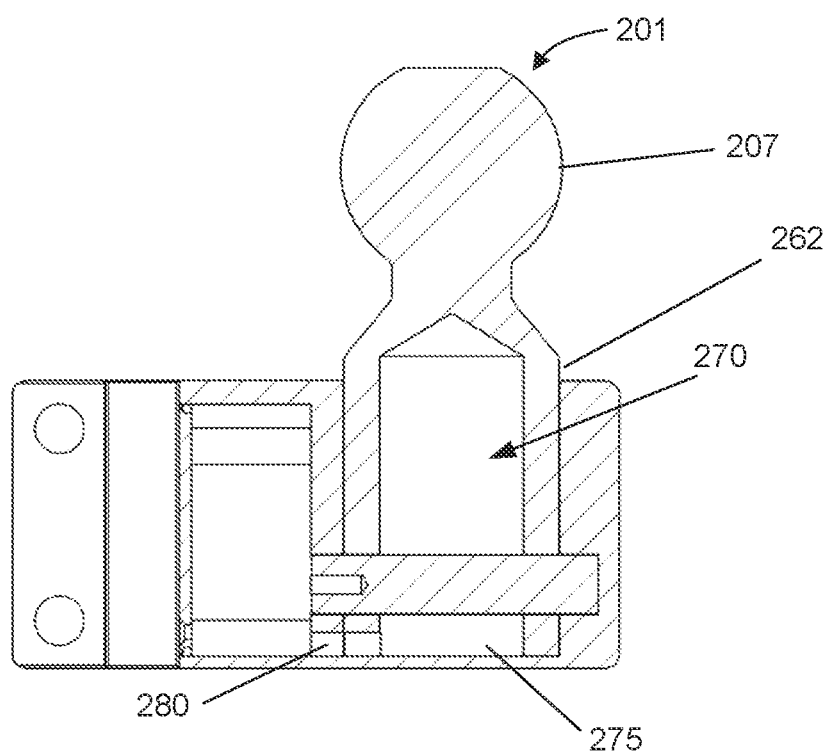
FIG. 6 illustrates a side cross-sectional view of an alternative embodiment of the load measuring hitch assembly of FIGS. 4A and 4B.

An alternative embodiment to FIG. 5 is shown in FIG. 6. Most all of the features of FIG. 5 as recited above are included in FIG. 6, and thus not numbered. The main difference is that assembly 201 includes a ball 207 with a lower portion 262 that includes a cavity or hollow space 270 therein. The hollow space can take nearly any desired size, shape, cross-section, or form and be either fully enclosed or include an opening 275. In such embodiment, the instrument portion can be included within, or can comprise the cavity and the acceleration sensors (not shown) can be contained therein. For example, acceleration sensors or other gauges, such as strain gauges (not shown) can be disposed inside of the cavity, for example on an interior side wall thereof. In such embodiment, an access opening 280 can further be provided in order to accommodate wires for power or other connection to the sensors disposed in the instrument portion of the cavity.

Figure 9:
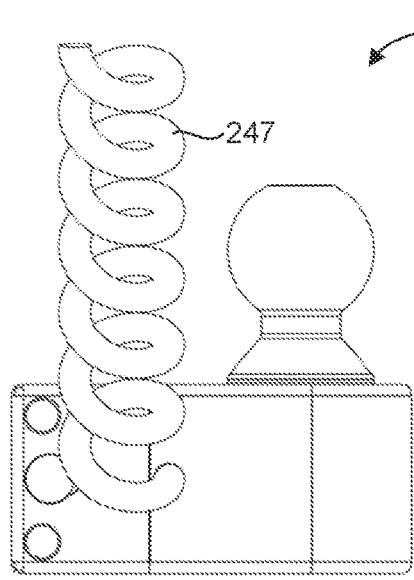
FIG. 9 illustrates a side view of a load measuring hitch assembly including a hitch portion, in accordance with example of the present disclosure.
Figure 10A:
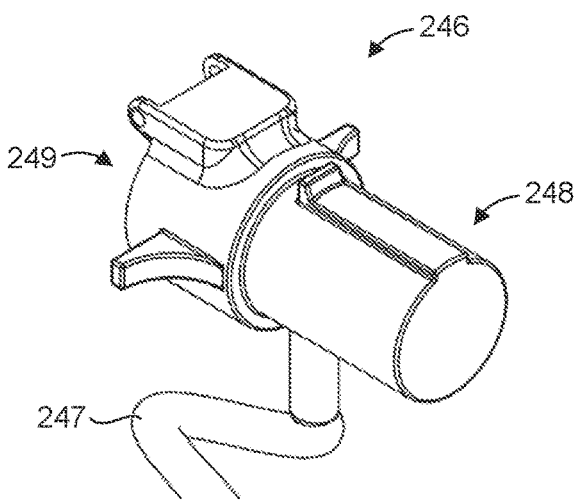
FIG. 10A illustrates a perspective view of an electrical connector of the load measuring hitch assembly of FIG. 9, in accordance with an example of the present disclosure.
Figure 10B:
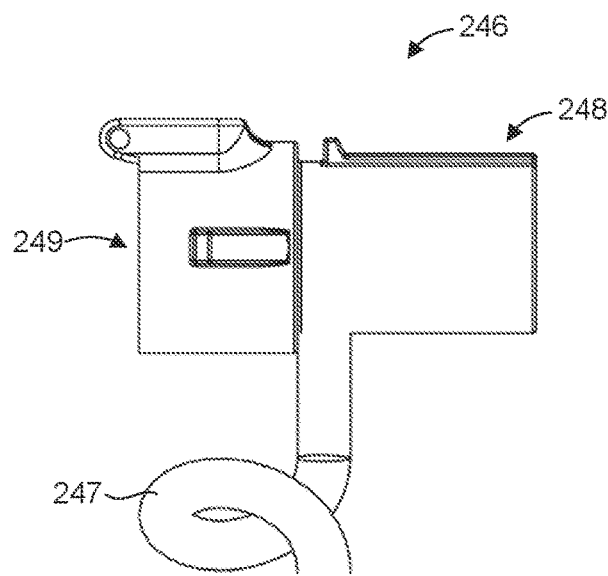
FIGS. 10B and 10C illustrate side views of the electrical connector of FIG. 10A.
Figure 10C:
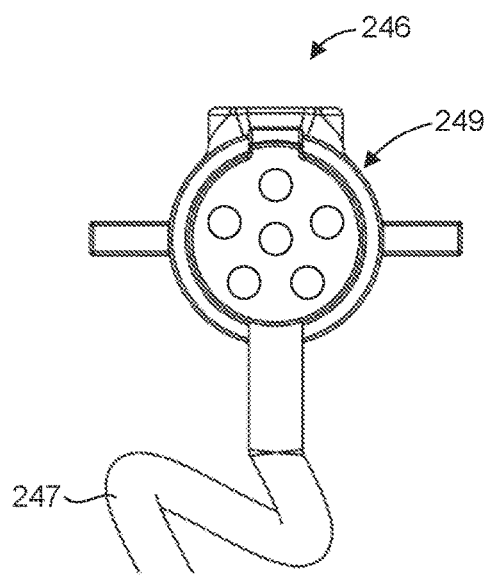

In one example, shown in FIG. 9-10C, a load measuring hitch assembly 201' can include an electrical connector 246 (FIGS. 10A-10C) and a cable 247 operably coupled to electronic device(s) (e.g., the processor 233, memory 234, the acceleration sensor 208, etc.) to facilitate communication with a remote electronic device (e.g., a remote display, a computer, such as an engine control unit (ECU) of the tow vehicle, etc.). In one aspect, the electrical connector 246 can be configured to interface with a tow vehicle wiring connector (e.g., a plug 248 at one end) and a trailer wiring connector (e.g., a receptacle 249 at another end). Such tow vehicle and trailer wiring connectors are known in the art and may conform to various industry standards. The plug 248 and the receptacle 249 can include an electrode, pin, or other suitable electrical interconnect structure in any suitable arrangement or configuration to interface with a given tow vehicle wiring connector configuration and a given trailer wiring connector configuration. The electrical connector 246 can therefore be configured to serve as a bridge connector between the tow vehicle wiring connector and a trailer wiring connector while also coupling with signal, data, and/or power cables in the wiring connectors to facilitate communication with a vehicle computer and/or a power coupling for the load measuring hitch assembly 201'.

Example Embodiments

The following examples pertain to specific technology embodiments and point out specific features, elements, or steps that may be used or otherwise combined in achieving such embodiments.

In one example there is provided a load measuring hitch assembly, comprising: a body portion operable to facilitate coupling the load measuring hitch assembly to a tow vehicle; and a hitch ball coupled to the body portion, the hitch ball having a ball operable to facilitate coupling the load measuring hitch assembly to a trailer, a lower portion coupled to the body portion in a fixed relationship, an instrument portion free to deflect due to at least one of a vertical or a horizontal force acting on the ball, and one or more force sensors operably coupled to the instrument portion to measure a force on the instrument portion in at least one measurement axis, thereby facilitating determining a magnitude of the at least one of the vertical or the horizontal force acting on the ball.

In one example of a load measuring hitch assembly, the one or more force sensors are operable to measure force in at least two orthogonal measurement axes.

In one example of a load measuring hitch assembly, the at least one measurement axis is parallel to at least one of a vertical direction or a horizontal direction.

In one example of a load measuring hitch assembly, the one or more force sensors comprises one or more strain gauges.

In one example of a load measuring hitch assembly, the body portion defines a hitch ball opening, and the lower portion is disposed at least partially in the hitch ball opening. In one example of a load measuring hitch assembly, the fixed relationship of the lower portion and the body portion provides a cantilevered support for the instrument portion and the ball.

In one example of a load measuring hitch assembly, the instrument portion is located between the ball and the lower portion.

In one example of a load measuring hitch assembly, the instrument portion is defined at least partially by a sensor recess that forms a reduced cross-sectional area portion of the hitch ball.

In one example of a load measuring hitch assembly, the assembly further comprises a flange extending outward below the ball, wherein the one or more force sensors are located below the flange.

In one example of a load measuring hitch assembly, the assembly further comprises a seal disposed between the flange and the body portion.

In one example of a load measuring hitch assembly, the lower portion includes a cavity defining an interior space within the lower portion.

In one example of a load measuring hitch assembly, the instrument portion is defined at least partially by the interior space within the lower portion.

In one example of a load measuring hitch assembly, further comprises an opening in a bottom of the lower portion providing access to the interior space in the cavity.

In one example of a load measuring hitch assembly, the body portion comprises a first pin opening and the lower portion comprises a second pin opening, and further comprising a pin extending into the first and second pin openings to couple the lower portion to the body portion in the fixed relationship.

In one example of a load measuring hitch assembly, the hitch ball opening is at least partially defined by a first threaded interface configured to engage a second threaded interface of the lower portion of the hitch ball.

In one example of a load measuring hitch assembly, the body portion comprises a chamber operable to house one or more electronic devices operably coupled to the one or more force sensors to receive signals from the at least one force sensors.

In one example of a load measuring hitch assembly, the one or more electronic devices comprises at least one of a processor or computer memory.

In one example of a load measuring hitch assembly, further comprises at least one of a transmitter or a receiver operably coupled to the one or more electronic devices to facilitate communication with a remote electronic device.

In one example of a load measuring hitch assembly, further comprises an electrical connector and a cable operably coupled to the one or more electronic devices to facilitate communication with a remote electronic device.

In one example of a load measuring hitch assembly, the electrical connector is configured to interface with a tow vehicle wiring connector and a trailer wiring connector.

In one example of a load measuring hitch assembly, further comprises a hitch portion removably coupleable to the body portion, the hitch portion being configured to interface with an attachment structure associated with the tow vehicle to facilitate coupling the load measuring hitch assembly to the tow vehicle.

In one example, there is provided a trailer hitch system, comprising a load measuring hitch assembly as recited herein operably coupled to a tow vehicle.

In one example, there is provided a method of measuring loads applied by a trailer on a tow vehicle, comprising operably coupling the load measuring hitch assembly of claim 1 to the tow vehicle; and engaging a coupling device of the trailer with the load measuring hitch assembly.

Of course, it is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A load measuring hitch assembly, comprising:
   a body portion operable to facilitate coupling the load measuring hitch assembly to a tow vehicle; and
   a hitch ball coupled to the body portion, the hitch ball having
      a ball operable to facilitate coupling the load measuring hitch assembly to a trailer,
      a lower portion coupled to the body portion in a fixed relationship,
      an instrument portion free to deflect due to at least one of a vertical or a horizontal force acting on the ball, and
      one or more force sensors operably coupled to the instrument portion to measure a force on the instrument portion in at least one measurement axis, thereby facilitating determining a magnitude of the at least one of the vertical or the horizontal force acting on the ball.

2. The load measuring hitch assembly of claim 1, wherein the one or more force sensors are operable to measure force in at least two orthogonal measurement axes.

3. The load measuring hitch assembly of claim 1, wherein the at least one measurement axis is parallel to at least one of a vertical direction or a horizontal direction.

4. The load measuring hitch assembly of claim 1, wherein the one or more force sensors comprises one or more strain gauges.

5. The load measuring hitch assembly of claim 1, wherein the body portion defines a hitch ball opening, and the lower portion is disposed at least partially in the hitch ball opening.

6. The load measuring hitch assembly of claim 1, wherein the fixed relationship of the lower portion and the body portion provides a cantilevered support for the instrument portion and the ball.

7. The load measuring hitch assembly of claim 1, wherein the instrument portion is located between the ball and the lower portion.

8. The load measuring hitch assembly of claim 1, wherein the instrument portion is defined at least partially by a sensor recess that forms a reduced cross-sectional area portion of the hitch ball.

9. The load measuring hitch assembly of claim 1, further comprising a flange extending outward below the ball, wherein the one or more force sensors are located below the flange.

10. The load measuring hitch assembly of claim 9, further comprising a seal disposed between the flange and the body portion.

11. The load measuring hitch assembly of claim 1, wherein the lower portion includes a cavity defining an interior space within the lower portion.

12. The load measuring hitch assembly of claim 11, wherein the instrument portion is defined at least partially by the interior space within the lower portion.

13. The load measuring hitch assembly of claim 12, further comprising an opening in a bottom of the lower portion providing access to the interior space in the cavity.

14. The load measuring hitch assembly of claim 1, wherein the body portion comprises a first pin opening and the lower portion comprises a second pin opening, and further comprising a pin extending into the first and second pin openings to couple the lower portion to the body portion in the fixed relationship.

15. The load measuring hitch assembly of claim 1, wherein the hitch ball opening is at least partially defined by a first threaded interface configured to engage a second threaded interface of the lower portion of the hitch ball.

16. The load measuring hitch assembly of claim 1, wherein the body portion comprises a chamber operable to house one or more electronic devices operably coupled to the one or more force sensors to receive signals from the at least one force sensors.

17. The load measuring hitch assembly of claim 16, wherein the one or more electronic devices comprises at least one of a processor or computer memory.

18. The load measuring hitch assembly of claim 16, further comprising at least one of a transmitter or a receiver operably coupled to the one or more electronic devices to facilitate communication with a remote electronic device.

19. The load measuring hitch assembly of claim 16, further comprising an electrical connector and a cable operably coupled to the one or more electronic devices to facilitate communication with a remote electronic device.

20. The load measuring hitch assembly of claim 1, further comprising a hitch portion removably coupleable to the body portion, the hitch portion being configured to interface with an attachment structure associated with the tow vehicle to facilitate coupling the load measuring hitch assembly to the tow vehicle.

\* \* \* \* \*